United States Patent [19]
Healy et al.

[11] 3,797,108
[45] Mar. 19, 1974

[54] METHOD FOR FABRICATING SELECTIVELY PLATED ELECTRICAL CONTACTS

[75] Inventors: Robert M. Healy, Warrenville; Ralph J. Hovey, Glen Ellyn, both of Ill.

[73] Assignee: The Bunker-Ramo Corporation, Oak Brook, Ill.

[22] Filed: Jan. 10, 1972

[21] Appl. No.: 216,854

Related U.S. Application Data
[62] Division of Ser. No. 815,609, April 14, 1969, abandoned.

[52] U.S. Cl. ............ 29/630 C, 29/630 R, 29/630 B
[51] Int. Cl. .............................................. H01r 9/00
[58] Field of Search ..................... 29/630 R, 630 C; 200/166 A; 113/119; 204/206

[56] References Cited
UNITED STATES PATENTS

| | | | |
|---|---|---|---|
| 3,537,175 | 11/1970 | Clair et al. | 113/119 R |
| 3,420,087 | 1/1969 | Hatfield et al. | 29/630 R |
| 3,229,357 | 1/1966 | Burstin | 29/630 C |
| 3,537,971 | 11/1970 | Green | 204/206 |
| 3,579,822 | 5/1971 | Dieterich | 29/630 |
| 3,137,645 | 6/1964 | Vaughan et al. | 204/206 |
| 2,897,584 | 8/1954 | Schumpelt | 200/166 C |
| 2,673,273 | 3/1954 | Vasold | 200/166 C |
| 3,675,320 | 7/1972 | Watanabe | 29/630 R |
| 2,547,947 | 4/1951 | Kleis et al. | 200/166 C |

*Primary Examiner*—Charles W. Lanham
*Assistant Examiner*—James R. Duzan
*Attorney, Agent, or Firm*—F. M. Arbuckle; D. R. Bair

[57] ABSTRACT

A method and apparatus for making electrical contact members from a continuous sheet or tape of electrically conductive material, the members being provided with precisely located plated wear areas adapted to establish electrical connection with a mating contact. Apparatus is provided for indexing the tape with longitudinally spaced apart locating pilots, and for coating the tape with a resist material in a manner to define precisely located non-coated areas thereon, the non-coated areas corresponding to the wear areas of the contacts. Thereafter, the tape is subject to a selective plating process which plates only the non-coated wear areas with a layer of noble metal. Cleaning apparatus is provided for removing the resist material from the tape, and apparatus is provided for punching and forming the contacts from the tape, the apparatus being operative to precisely fixed the plated wear areas of the contacts with respect to the indexing pilots. In this manner, each of the contacts formed is provided with a precisely located plated wear area.

1 Claim, 12 Drawing Figures

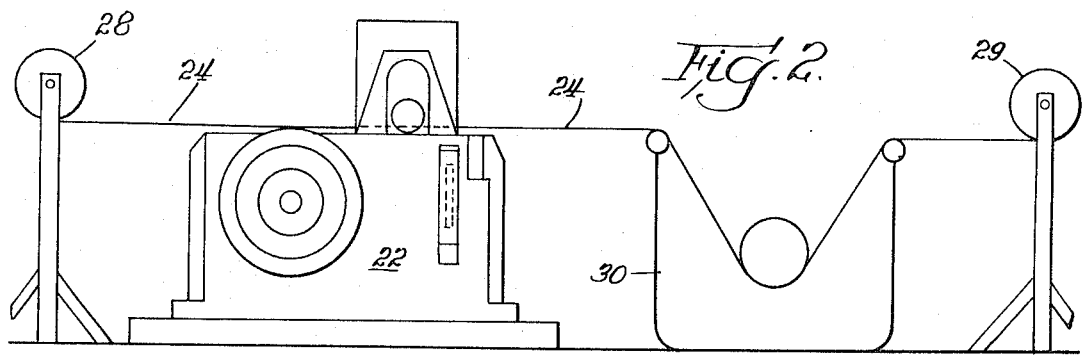
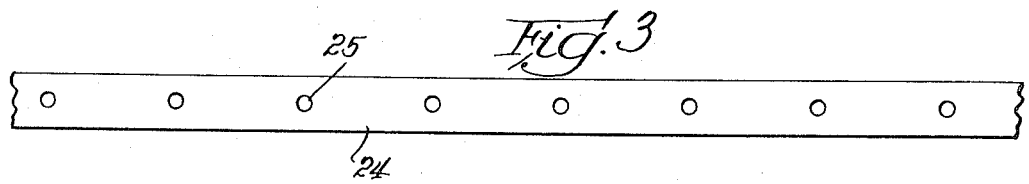
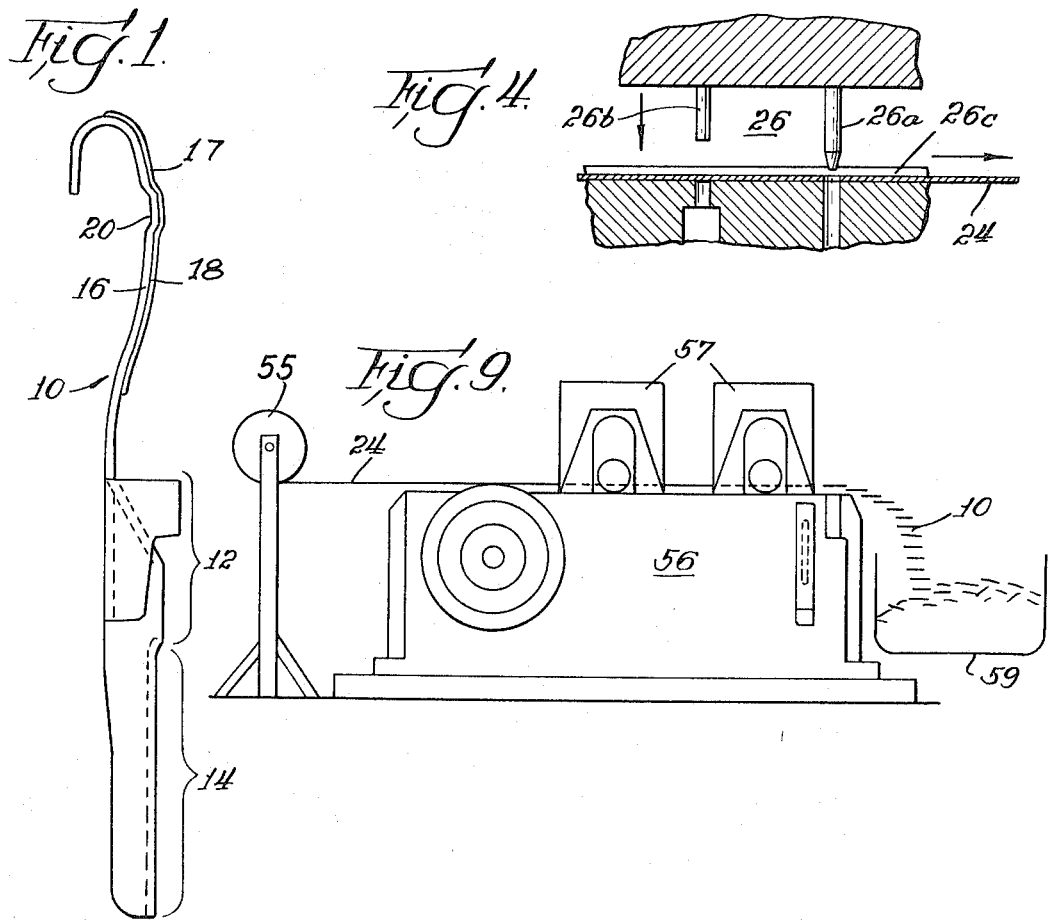

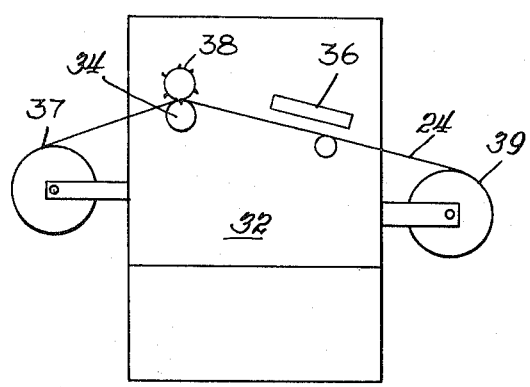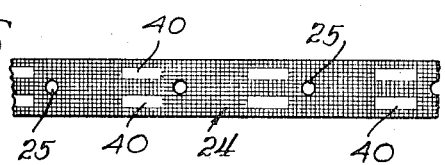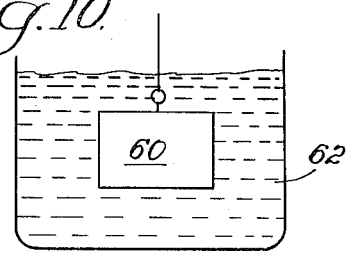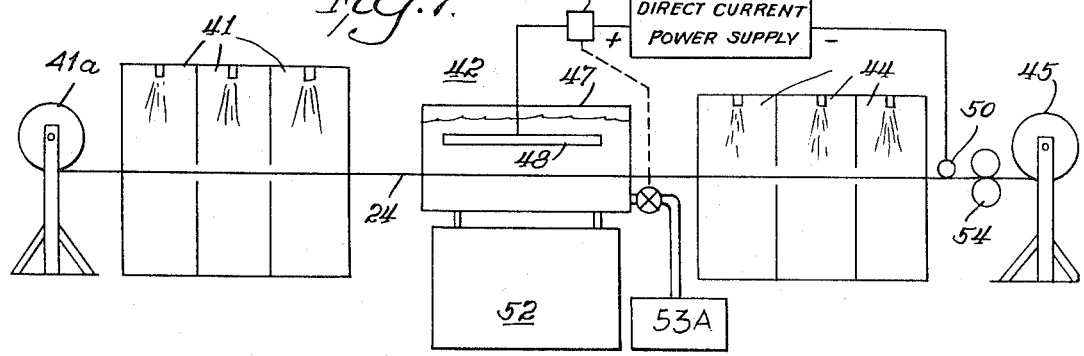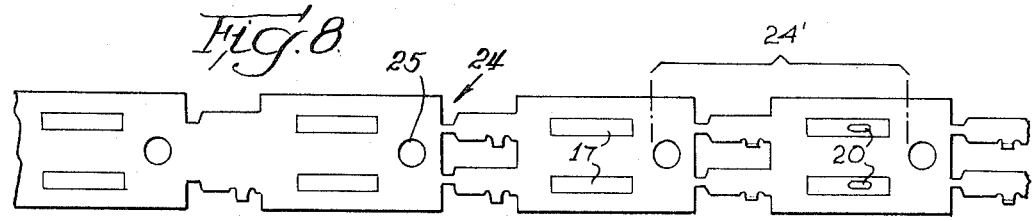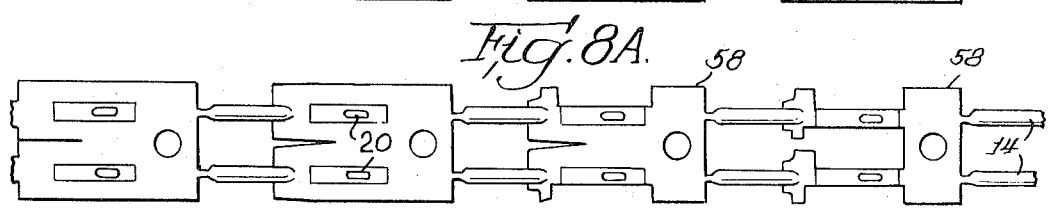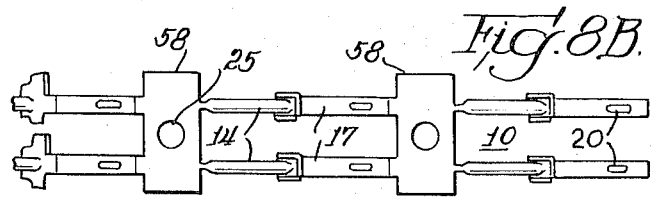

METHOD FOR FABRICATING SELECTIVELY PLATED ELECTRICAL CONTACTS

This is a division, of application Ser. No. 815,609, filed Apr. 14, 1969 now abandoned.

BACKGROUND OF THE INVENTION

The present invention relates generally to manufacturing electrical contact members, and particularly to a fabricating process and apparatus for rapidly and economically producing large quantities of selectively plated contact members in a continuous manner.

An electrical contact member generally has a terminal portion to which a conductor or wire may be electrically connected and an engagement portion and surface adapted to mechanically engage and mate with a similar portion and surface of another contact member. With use of the contact members, the engagement surface becomes the active area of the contact, subject to substantial wear. In the position in which two contact members are fully mated or engaged, this engagement or wear area must be substantially free of contamination or oxides which inhibit the flow of electrical current between the two contacts. For this reason, electrical contacts have been plated with costly, non-corrosive noble metals such as gold, using generally conventional plating processes and apparatus.

Heretofore the conventional method of plating large quantities of contact members has been the barrel type of process in which a large number of the contact members are placed in a perforated vessel which is rotated in an electrolytic plating solution of noble metal. A negative potential is applied to the contacts by a conductor or electrode which hangs loosely in the vessel. As the vessel rotates, the contact members tumble therein and intermittantly come into contact with the electrode. Plating current thereby passes to those members which directly contact the electrode as well as those which in turn physically touch such members. The members, however, that are not in physical contact with the electrode or with other members that are in contact therewith, receive no plating current. Thus, plating current tends to be non-randomly applied to the contact members during a barrel type plating process. For this reason, the thickness of the deposited metal is not uniform from member to member.

Moreover, contact members are preferably made from spring metals such as cadmium bronze. When cadmium bronze is placed in a gold plating solution and no electrical potential is applied to the bronze the cadmium tends to enter and contaminate the plating solution. To avoid such contamination, the sheet metal from which the contact members are made has heretofore been first plated with a layer of copper to prevent the cadmium of the cadmium bronze metal from coming directly into contact with the gold plating solution.

When plating contact members of the type described the barrel type of plating process is not economical of the plating metal in that the entire surface of each contact member is plated rather than just the wear area. If the plating metal is a precious metal such as gold, the cost and waste of such a plating process can be quite substantial.

A more recent approach to the problem of selectively coating large numbers of electrical contacts is disclosed in U.S. Pat. No. 3,137,645, issued to R. T. Vaughan et al. on June 16, 1964. The Vaughan et al. patent discloses apparatus wherein a limited area of a contact member is plated, the plating being accomplished by action of jet streams of electrolyte plating solution directed thereagainst. The jet streams are provided by a plurality of nozzles, and a chain of the contact members is conducted past the nozzles for the plating operation. While the Vaughan et al. apparatus does not plate the entire contact member the spraying action prevents sharply defined plated areas from being formed. Consequently, to ensure that a given thickness of metal will be deposited on a given wear area of a contact member it is necessary to employ a nozzle which produces a jet stream having an effective area substantially larger than the wear area. This is, of course, wasteful of the metal in the plating solution.

A further problem with the Vaughan et al process is that of cadmium contamination of the gold plating solution as explained above with respect to the barrel type of plating process. Vaughan et al gravity feed their plating nozzles from a reservoir of the plating solution located above the nozzles. In the event of the loss of plating potentials, the plating solution would continue to be directed against the contact members, with the possibility of the cadmium in the contact members entering into the solution of the plating metal.

BRIEF SUMMARY OF THE INVENTION

Broadly, the present invention comprises a method an apparatus capable of rapidly and economically mass producing large quantities of electrical contact members having plated portions precisely located on the active wear area and surface of each member. This is accomplished by first providing a sheet or tape of electrically conductive material, the sheet or tape being of such a dimension that successive incremental lengths thereof serve as a plurality of interconnected blanks from which the contact members are formed. The tape is next continuously provided with longitudinally spaced locating indices or pilots, and then continuously, selectively coated with a resist material in a manner to define non-coated or bare areas thereon corresponding to the wear areas, the non-coated areas being precisely located with respect to said locating pilots. The tape is next continuously subjected to a plating solution of noble metal, said metal adhering only to the non-coated areas of the tape to form plated wear areas thereon. The resist material is then removed from the tape and the incremental lengths of the tape are subjected to a forming and punching operation. The apparatus for performing this operation engages the locating pilots in a manner to accurately locate the plated wear areas with respect to the pilots so that as each contact member is formed it is provided with a precisely located plate wear area with respect to the remaining portions of the contact member. Preferably, after the contacts are formed and separated from the tape, they are plated with an extremely thin layer of noble metal by an electroless plating operation to prevent the member from future tarnishing and oxidation.

The invention, as only briefly described thus far, provides a highly economical method of plating electrical contacts that is particularly useful when the plating metal is a precious metal such as gold.

THE DRAWINGS

The invention, with its objectives and advantages, will be best understood from consideration of the following detailed description taken in connection with the accompanying drawings in which:

FIG. 1 is an enlarged side elevation view of a contact member fabricated in accordance with the principles of the invention;

FIG. 2 shows apparatus for performing at least the initial step of the invention through which an electrically conductive tape is provided with locating indices or pilots;

FIG. 3 is a plan view of the tape produced by the apparatus of FIG. 2;

FIG. 4 is diagrammatic representation of a punching die embodied in the apparatus shown in FIG. 2;

FIG. 5 diagrammatically illustrates apparatus for performing a following step of the invention in which the tape is selectively coated with a resist material;

FIG. 6 shows the tape coated with the resist material;

FIG. 7 diagrammatically illustrates apparatus for performing further steps of the inventive process in which the tape is continuously, selectively plated and the resist material is thereafter continuously removed from the tape;

FIGS. 8 through 8B represent various forms which the tape successively takes during yet another step of the invention in which electrical contact members are formed from the tape;

FIG. 9 shows apparatus for forming the contacts of FIG. 8;

FIG. 10 shows means for performing a final plating step.

PREFERRED EMBODIMENT

Specifically, FIG. 1 is an enlarged side view of a plated metallic contact member 10 made in accordance with the principles of the invention. The contact 10 is of the type and configuration shown and described in U. S. Pat. No. 3,002,176, issued Sept. 26, 1961, to R. S. Yopp and assigned to the present assignee. Such contact members are made from a spring metal, such as cadmium bronze, and have mounting shank and terminal portions 12 and 14 respectively, and a contact engaging blade portion 16. The mounting and terminal portions are formed to have a three-sided channel shape adapted to seat in a cavity formed in a molded insulating connector, for example, as shown in the above-mentioned Yopp patent. The terminal portion 12 is adapted to be joined with an electrical conductor or wire (not shown). The blade portion 16 is formed to engage and mate with a similar blade portion of an opposite contact member in an active wear area defined by a layer of noble metal 17 deposited on a convex surface 18 of the blade in accordance with the principles of the invention as hereinafter explained. The blade 16 is further provided with a smoothly rounded convex bulge or protuberance 20 on the convex surface portion 18 thereof so that the wear area of the blade includes the protuberance 20.

The layer of noble metal 17 on the blade 16 must be of a thickness sufficient to insure against the metal of the blade surface 18 from becoming exposed to the atmosphere. When oxidation begins to form even in an extremely small portion of the wear area, the samll portion becomes a source of contamination from which oxidation substances are spread to the remaining portions of the wear area. The spread of the contamination is brought about when the use of the contact member is placed in or removed from mating engagement with an identical or another contact member.

FIG. 2 shows apparatus for beginning the process of the invention. More particularly, FIG. 2 shows a punch press 22, a tape 24 of spring metal material, such as cadmium bronze, being continuously directed through the press from a feed reel 28 to a take-up reel 29. Between the press and the take-up reel is located a vessel 30 through which the tape is conducted, the vessel representing a means for cleaning the tape.

The punch press 22 provides the tape with indexing or locating pilot holes 25 as shown in FIG. 3. This is accomplished by a punching die 26 separately depicted in FIG. 4, the die 26 being a part of the punch press 22.

The punching die 26 comprises essentially a tapered locating pin 26a and a punching or perforating pin 26b, the locating pin being longer than the punching pin. The tape 24 is successively advanced through the die to undergo the punching process, the locating pin 26a fixing the position of the tape for the punching pin 26b. In this manner, the pilot holes are formed and located in exact spacial relationship to each other in a longitudinal direction.

The tape 24 is further fed through the punch press 22 and through the die 26 with one edge of tape in sliding engagement with an edge or guide 26c, the edge or guide being shown in elevation in FIG. 4. In this manner, the engaged edge of the tape functions as a fixed reference for the lateral displacement of each pilot hole 25.

The holes 25 provided in the tape 24 act as locating indices or pilots which function to precisely locate the tape in the various operations to be performed thereon. Although preferably in the form of apertures or slots these indices may be simply printed or embossed areas which are electrically, photometrically or mechanically sensed in effecting the desired locating function.

Successive incremental lengths 24' (FIG. 8) of the tape 24 as thus far described, serve as a plurality of interconnected blanks from which pluralities of contact members 10 (FIG. 1) are formed and punched in a manner explained hereinafter.

FIG. 5 shows diagrammatically apparatus for performing the next step of the invention. Specifically, FIG. 5 shows a printing apparatus 32 having printing rollers 34, a drying means 36, and feed and take-up reels 37 and 39 respectively. The tape 24, after being indexed and cleaned by the process and apparatus of FIG. 2, is conducted through the printing rollers 34 in a continuous manner by drive means (not shown) driving the take-up reel 39. The rollers 34 are adapted to coat the tape with a resist material on all areas thereof where a layer of a noble plating metal is not desired. More particularly, at least one of the rollers is provided with a pattern having a dimension corresponding to the plated wear area 17 of the contact member 10, the roller applying the resist material in a manner to define the wear areas in discrete, non-coated or bare areas 40 as shown in FIG. 6. The non-coated areas 40 are precisely located with respect to the indexing holes 25 by virtue of indexing projections 38 (only representively shown and provided on the upper roller in FIG. 5), the projections engaging the holes 25 as the tape passes through the rollers. The projections are precisely located with respect to the pattern on the printing roller to effect the precise location of the non-coated areas 40.

In a preferred embodiment of the invention the rollers 34 coat one side of the tape and both edges thereof completely with the resist material, whereas the other side of the tape is provided with two rows of the non-coated areas 40 as shown in FIG. 6. In this manner, the blank from which the contact members will be formed, includes the area of the tape encompassing two side-by-side non-coated or bare areas 40 and an associated pilot hole 25. From each blank, two contact members 10 will be formed and separated from the tape in a manner explained hereinafter. The number of contact members formed, however, from each blank may be one or more than two depending upon the dimensions of the tape and the contact members to be formed therefrom.

After the resist material is applied to the tape 24, the material is dried and hardened thereon by the drying means 36, only representively shown in FIG. 5, the tape being collected on the reel 39.

The resist material employed in the coating process may be any material capable of being continuously applied and will adhere to the tape during the future selective plating process, yet can be removed from the tape after the plating process. An example of such a material would be removable ink such as flexographic printing inks which are well known in the printing art, though the invention is not limited thereto.

In a similar manner, the apparatus 32 may be any device capable of applying the resist material in a controlled, continuous manner, for example, a flexographic printing press such as model 416 Webron labelling machine, though other devices may be used.

FIG. 7 shows, schematically, apparatus for performing the next successive steps in the inventive process as thus far described. More particularly, FIG. 7 shows enclosures or containers 41 for performing continuously an additional cleaning operation upon the tape as it is removed from a feed reel 41a and before it is conducted to an electrolytic plating apparatus 42. Thereafter, the resist material is continuously removed from the tape in enclosures or containers 44 located downstream from the plating apparatus 42, before being collected on a take-up reel 45.

The plating apparatus 42 is schematically represented by an enclosure or tank 47 containing an anode plate or grid 48 electrically connected to the positive side of a direct current power supply 49. The negative side of the power supply is electrically connected to the tape 24 by a tape contacting brush (only representatively shown by a circle 50 in FIG. 7) located downstream of the containers 44 employed for removing the resist material. In this manner, a bare tape is available for making good electrical contact with the brush thereby making the tape a cathode for the plating process. Beneath the tank 47 is located a container 52 containing an electrolytic solution of noble plating metal. The solution is directed to the enclosure 47 from the container 52, and returned thereto after the plating process for subsequent plating use, the container serving as a reservoir of the plating metal and solution.

In the plating process, the tape 24 is continuously conducted through the plating tank 47 and through the solution of noble metal contained therein. With a positive potential applied to the anode 48, and a negative potential applied to the tape via the brush 50, plating current is conducted through the solution to the bare, non-coated areas 40 of the tape to deposit the noble metal only on said areas, the coating of resist material functioning as an electrically resistive and substantially non-conductive material which prevents plating on those surfaces of the tape covered by the resist material. The plating metal deposits in a substantially uniform manner on the non-coated areas 40 to form the layer 17 (FIG. 1) having a desired thickness dimension, a desired thickness dimension being preferably in the order 30 micro inches.

As can readily be appreciated, the only plating metal used in the present selective plating process is the metal applied to the wear areas of the contact. Substantially no metal is wasted, the plated metal being confined to the area of the contact where it is needed, namely, the wear area.

Thus, when plating precious metals such as gold, substantial savings may be realized through the use of the present invention in contrast to prior art methods.

The solution of noble metal employed in the plating process of the present invention is preferably a hard, cobalt gold solution made from potassium gold cyanide. An example of such a solution is the Autronex C I Process Solution manufactured by the Sel Rex Corporation of Nulley, New Jersey, though other hard gold solutions are available and can be used. A hard gold is preferable for the active, wear area of each completed contact 10 to insure that the wear area remains completely provided with a non-corrosive, non-oxidizing metal during the life of the contact member or connector in which the member is employed.

During the plating process, as long as the potentials are properly applied to the anode 48 and the tape 24, and current flow is in the direction of the tape, the cadmium in the metal of the tape will not dissolve to any meaningful extent in the gold solution to contaminate the solution, the direction of plating current tending to maintain the cadmium in combination with the copper of the tape as explained earlier. If, however, the application of the potentials is interrupted during the plating process, a means is provided for automatically draining the solution of gold from the plating tank 47 before the cadmium has opportunity to dissolve in and contaminate the gold solution. Such an automatic draining means may include a sensing relay 53 (only representatively shown in FIG. 7) electrically connected in the circuit of the power supply 49, and operative to effect the release of the plating solution to a container 53A when the relay senses the absence of plating current. From the container 53A the solution may be returned to the reservoir container 52 in a suitable manner. For this reason, in the present invention, it is not necessary to plate a cadmium bronze tape with copper in order to prevent cadmium contamination of the gold solution.

In FIG. 7, the apparatus for cleaning the blanks and for removing the resist material employs liquid spray nozzles located within the containers 41 and 44 for directing suitable cleaning liquids against the blanks though other means be employed in place thereof or in conjunction therewith. A suitable cleaning fluid would be normal alcohol which is a common, wellknown solvent for ink in the printing industry.

The tape may be drawn through the containers 41, 44 and the plating tank 47 by a suitable drive means, for example, by positive friction drive rollers 54 only diagrammatically indicated in FIG. 3. The rollers may be driven by a variable speed motor (not shown) connected to further drive the take-up reel 45 in a manner which maintains suitable tension on the tape.

By controlling the speed at which the tape 24 is pulled through the plating tank 47 and/or by controlling the potential difference between the tape and the anode plate 47, the desired thickness of the metal plate can be precisely controlled.

After the non-coated or bare areas 40 are plated and the tape is collected on the take-up reel 45, the tape is ready for the process of punching and forming the completed, individual contact members 10.

In FIG. 9, a device 56 for performing this process is diagrammatically depicted, the device being a punch press 56 having contact forming and punching dies 57. The press and dies operate in a manner to preciesely locate the area of each contact member on the tape before the contact is formed and separated from the tape. The dies 57 form and punch the contact members in successive pairs from the tape, and the process by which the dies accomplish this 10 is indicated in FIGS. 8 to 8B. The punch press moves successive incremental portions 24' of the tape 24 from a feed reel 55 through its punching dies 57 in successive steps during which portions of the metal encompassing the contact area are successively punched away. The tape is precisely located in the dies by the successive engagement of two pins of a pilot punch cooperating with an edge guide (not shown). The spacing of the pins relative to each other and to the edge guide are the same as those of the punching die 26 shown in FIG. 4. In this manner, the contacts are precisely located with respect to the indexing pilots so that when the contacts 10 are finally formed and severed from the tape, the plated wear area 17 of each contact member 10 is precisely located with respect to the remaining portions of the contact member.

As the contact members 10 are formed in pairs, as shown in FIGS. 8A and B, and the metal is cut away by the dies 57, a portion 58 of each blank associated with a pilot hole 25 serves essentially as a carrier portion which carries each pair of contacts until the contacts are finally severed therefrom. The severed, completed contacts are collected in a container 59 as shown in FIG. 9.

The punch press 56, and the operation thereof, as described above, is basically that of a multi-slide machine manufactured by the United States Tool Company. In the present invention, however, other types of contact member forming machines and devices may be used without departing from the spirit and scope thereof.

After the contact members 10 are formed and separated from the tape 24, the unplated portions of the contact members are plated with an extremely thin layer of a noble metal in order to prevent the members from future tarnishing. A suitable thickness for the thin layer would be on the order of two to five micro inches. This is accomplished by an electroless, immersion type of plating process as diagrammatically indicated in FIG. 10, the contact members being placed in a basket 60 or other suitable container and lowered into a solution 62 of the plating metal.

An electroless plating process is a preferential plating process in which the noble metal, (for example, a substantially pure, soft gold) exchanges places with the metal of the part to be plated on an ion exchange basis. The thickness of the plating produceable by this type of process is limited as in the case of gold to a few micro inches since the heavier the deposition of the gold on the part the more the electroless plating process is inhibited. The electroless process is particularly suitable for purposes of the present invention since the thickness of the plating is substantially that required to provide the non-tarnishing, thin layer of soft gold over the portions of each contact members not covered by the heavier layer of noble metal 17. The electroless type of plating operation is a well-known process, and there are a variety of gold solutions available for this type of plating process.

In the description of the present invention, the term noble metal is representative of any substantially inert, non-corrosive or non-oxidizing metal suitable to maintain the surfaces of the contact members 10 free from contaminating substances which would adversely affect their ability to conduct electrical current when disposed in mating engagement with other contact members.

From the foregoing description it should now be apparent that the present invention provides a new and useful process and apparatus for rapidly and continuously fabricating plated electrical contact members in an economical manner. This is accomplished by first providing a continuous tape of spring metal material with locating pilots. The tape is next continuously directed through a coating device, the coating device applying a resist material to the tape in a manner to precisely define bare areas thereon corresponding to wear areas of the contact members. Thereafter the tape is continuously subject to a plating process in which a layer of noble or other non-corrosive metal is applied to the bare areas only. The resist material is continuously removed from the tape and the tape is next subjected to a contact forming operation in which the plated wear areas are successively and precisely fixed with respect to the locating pilots before the contact members are formed and punched from the tape. In this manner, each completed contact member is provided with a plated wear area that is precisely located with respect to the remaining portions of the contact member.

Though the invention has been described with a certain degree of particularity, changes may be made therein without departing from the spirit and scope thereof.

What is claimed is:

1. A continuous method of fabricating electrical contact members of the type wherein each member has a wear area adapted for mating engagement with another contact member to establish electrical connection therewith, and a terminal portion adapted to be joined to an electrical conductor, the method comprising the steps of:

providing a long, thin, narrow, flexible spring metal tape of such dimensions that successive incremental lengths of the tape are adapted to act as plurality of interconnected contact blanks from which said contacts are punched, advancing said tape longitudinally in successive steps through the dies of a punch-press and punching at least one series of regularly spaced pilot holes therein, thereafter feeding said tape through a printing means by successive engagement of indexing means of the printing means with the pilot holes in the tape, and printing on resist material on both edges and both sides of said tape, with the printing on at least one side of said tape comprising a regularly recurring pattern of resist material characterized by at least one bare area surrounded by said resist material for each contact member to be produced corresponding to the wear area of each completed contact and located in precise spacial relationship to the aforesaid pilot holes in said tape, thereafter subjecting said tape to a selective plating process whereby a layer of a substantially inert, non-corrosive metal of a desired thickness is applied only to the bare areas of said tape, thereafter removing the printed resist material pattern from all areas on said tape, again advancing said tape longitudinally in successive steps through the dies of a punch-press, and subjecting each incremental length of said tape to at least one punching operation followed by at least one forming operation to form each contact member with a plated wear area in precisely fixed spacial relationship with respect to the pilot holes of said tape, whereby the plated wear area is precisely located with respect to the remaining portion of each contact member formed.

* * * * *